US012432263B2

(12) United States Patent
Lee et al.

(10) Patent No.: US 12,432,263 B2
(45) Date of Patent: Sep. 30, 2025

(54) DEVICE AND METHOD FOR PROVIDING EDGE COMPUTING SERVICE BY USING NETWORK SLICE

(71) Applicant: Samsung Electronics Co., Ltd., Gyeonggi-do (KR)

(72) Inventors: Jicheol Lee, Gyeonggi-do (KR); Hyesung Kim, Gyeonggi-do (KR)

(73) Assignee: Samsung Electronics Co., Ltd., Seoul (KR)

( * ) Notice: Subject to any disclaimer, the term of this patent is extended or adjusted under 35 U.S.C. 154(b) by 410 days.

(21) Appl. No.: 17/923,764

(22) PCT Filed: May 6, 2021

(86) PCT No.: PCT/KR2021/005690
§ 371 (c)(1),
(2) Date: Nov. 7, 2022

(87) PCT Pub. No.: WO2021/225389
PCT Pub. Date: Nov. 11, 2021

(65) Prior Publication Data
US 2023/0180117 A1  Jun. 8, 2023

(30) Foreign Application Priority Data

May 7, 2020 (KR) .................. 10-2020-0054796

(51) Int. Cl.
*H04L 12/28* (2006.01)
*H04L 65/1073* (2022.01)
(Continued)

(52) U.S. Cl.
CPC ........ *H04L 65/1073* (2013.01); *H04L 67/289* (2013.01); *H04W 48/18* (2013.01); *H04W 84/042* (2013.01)

(58) Field of Classification Search
CPC .................. H04L 67/289; H04W 48/18
(Continued)

(56) References Cited

U.S. PATENT DOCUMENTS 6,810,411 B1  10/2004 Coughlin et al.
2019/0254094 A1*  8/2019 Babu ................ H04W 76/15
(Continued)

FOREIGN PATENT DOCUMENTS

KR  10-2019-0132018  11/2019

OTHER PUBLICATIONS

Samsung, "Solution 2 Update and Conclusion for Key Issue #1 and #7", S6-192113, 3GPP TSG-SA WG6 Meeting #34, Nov. 11-15, 2019, 5 pages.
(Continued)

*Primary Examiner* — Dang T Ton
(74) *Attorney, Agent, or Firm* — The Farrell Law Firm, P.C.

(57) ABSTRACT

The present disclosure relates to: a communication technique merging, with kJ technology, a 5G communication system for supporting a data transmission rate higher than that of a 4G system; and a system therefor. The present disclosure relates to a wireless communication system. A terminal of the present disclosure comprises a transceiver and at least one processor, wherein the at least one processor can be configured to: transmit, to a first server, a first request message for requesting information provision; receive, from the first server, first information including information related to a plurality of ECSPs and information used for selecting one from among a plurality of application servers included in the plurality of ECSPs; transmit, on the basis of the first information, a second request message for requesting second information, related to the application servers, to a plurality of second servers corresponding to the plurality
(Continued)

of ECSPs; receive the second information related to the application servers from the plurality of second servers; and select one from among the application servers on the basis of the first information and the second information.

20 Claims, 15 Drawing Sheets

(51) Int. Cl.
*H04L 67/289* (2022.01)
*H04W 48/18* (2009.01)
*H04W 84/04* (2009.01)

(58) Field of Classification Search
USPC .................................. 370/329, 401, 402, 403
See application file for complete search history.

(56) References Cited

U.S. PATENT DOCUMENTS

| | | | |
|---|---|---|---|
| 2019/0268835 A1* | 8/2019 | Shan | H04W 48/16 |
| 2019/0356743 A1 | 11/2019 | Park et al. | |
| 2020/0120182 A1 | 4/2020 | Kotecha et al. | |

OTHER PUBLICATIONS

Qualcomm Incorporated et al., Pseudo-CR on FFS in Cardinality Rules (Clause 6.5), S6-200529, 3GPP TSG-SA WG6 Meeting #35, Jan. 13-17, 2020, 2 pages.
Korean Office Action dated Jul. 15, 2024 issued in counterpart application No. 10-2020-0054796, 11 pages.
PCT/ISA/210 Search Report issued on PCT/KR2021/005690, Aug. 13, 2021, pp. 7.
PCT/ISA/237 Written Opinion issued on PCT/KR2021/005690, Aug. 13, 2021, pp. 5.
Huawei, Hisilicon, "Service provisioning procedures", 3GPP TSG-SA WG6 Meeting #36BIS-e S6-200505, Mar. 25, 2020, pp. 6.
3GPP TS 23.501 V16.4.0, Mar. 27, 2020, Technical Specification, 3rd Generation Partnership Project; Technical Specification Group Services and System Aspects; System architecture for the 5G System (5GS); Stage 2 (Release 16), pp. 432.
Samsung, "Deployment model for different Network Slice implementations", 3GPP TSG-SA WG6 Meeting #36-BIS-e S6-200473, Mar. 25, 2020, pp. 6.
Catt, "Pseudo-CR on Solution of Initial Provisioning with Authorization", S6-192153, 3GPP TSG-SA WG6 Meeting #34, Nov. 11-15, 2019, 6 pages.
Ericsson, "Edge Application Server Discovery and Selection using DNS", S2-2000196, 3GPP TSG-SA/WG2 Meeting #136-AH, Jan. 13-17, 2020, 4 pages.
European Search Report dated Oct. 19, 2023 issued in counterpart application No. 21799551.3-1213, 7 pages.
Korean Office Action dated Mar. 25, 2025 issued in counterpart application No. 10-2020-0054796, 8 pages.

* cited by examiner

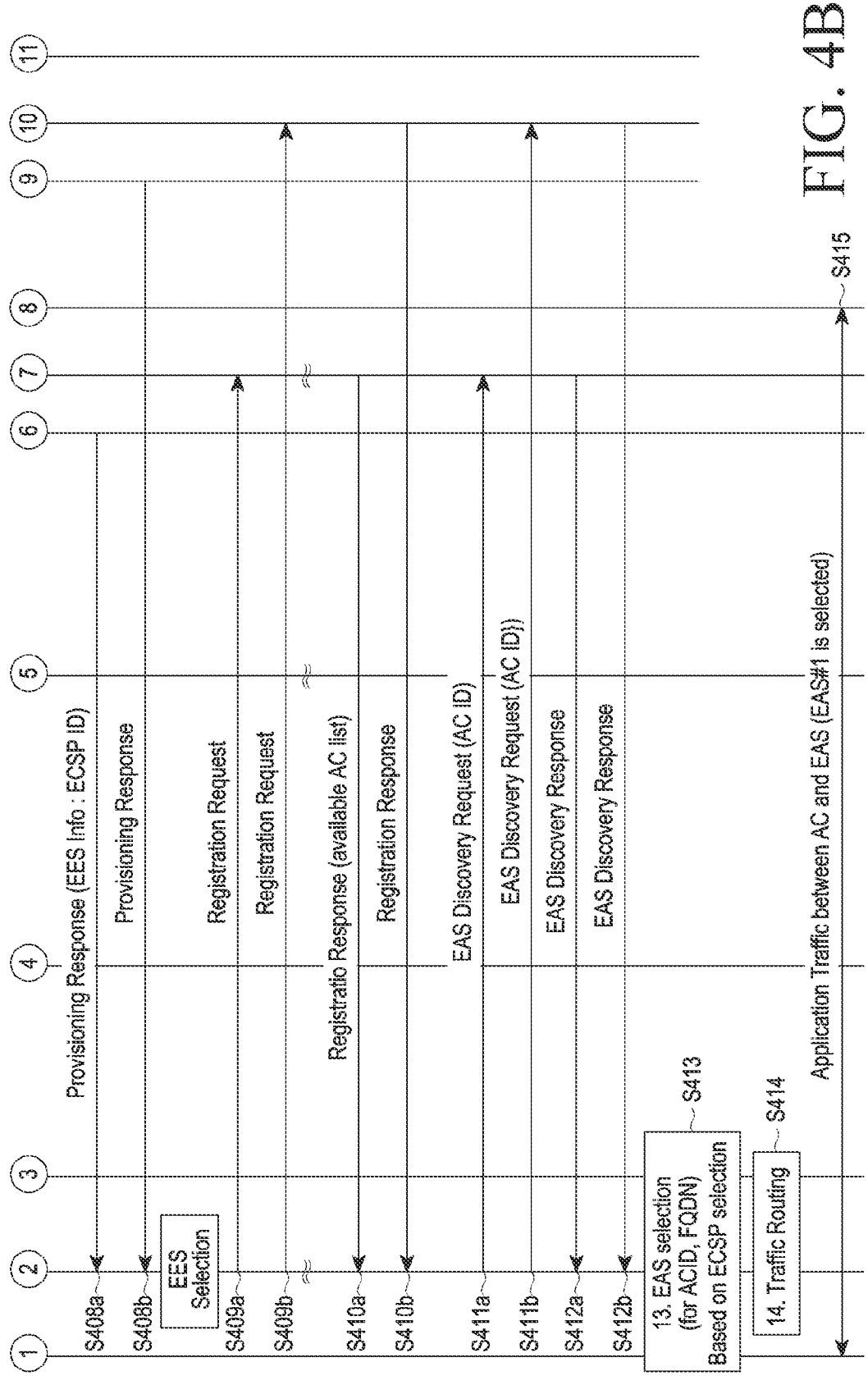

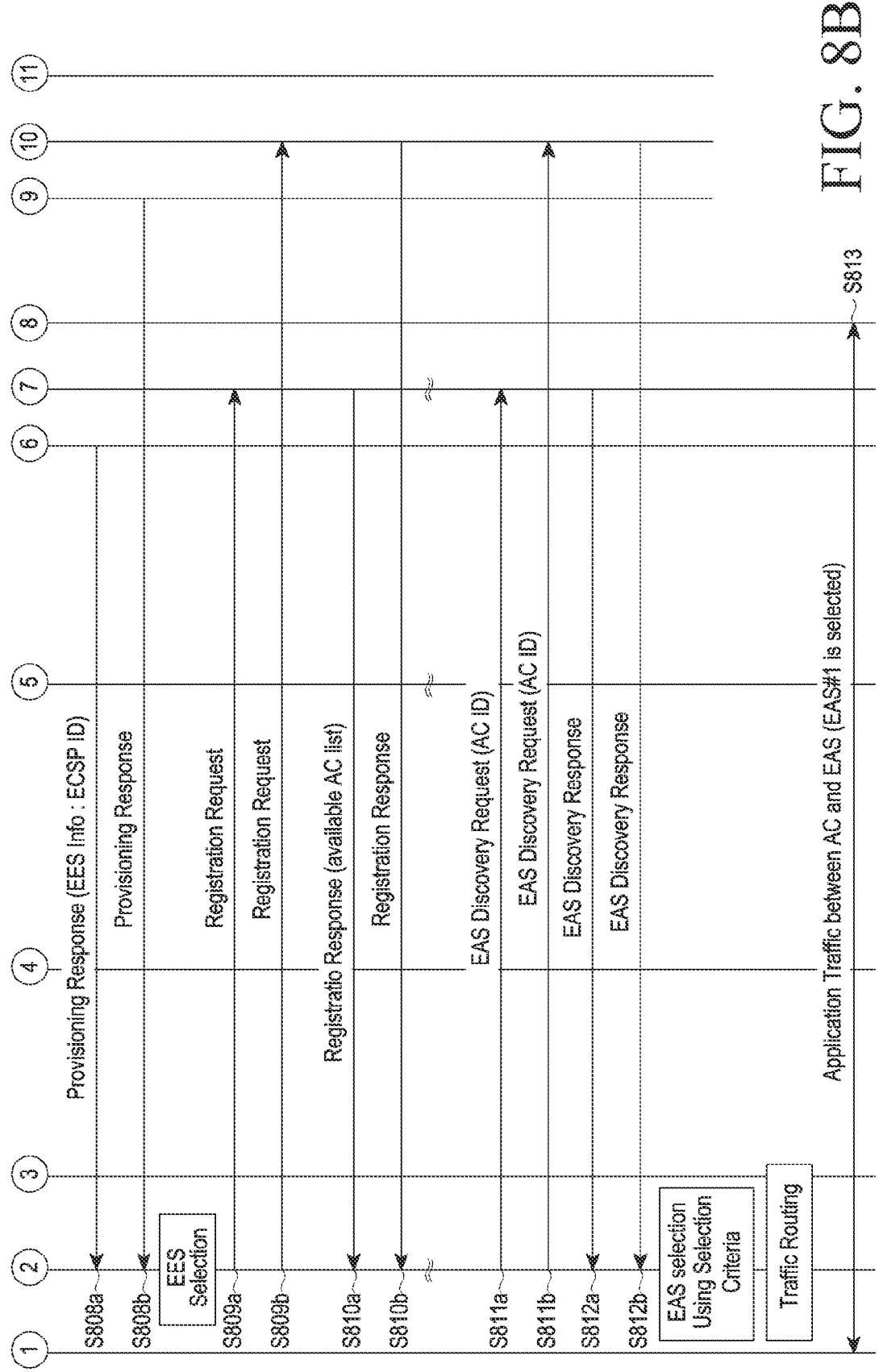

DEVICE AND METHOD FOR PROVIDING EDGE COMPUTING SERVICE BY USING NETWORK SLICE

CROSS-REFERENCE TO RELATED APPLICATION(S)

This application is a U.S. National Phase Entry of PCT International Application No. PCT/KR2021/005690, which was filed on May 6, 2021, and claims priority to Korean Patent Application No. 10-2020-0054796, which was filed in the Korean Intellectual Property Office on May 7, 2020, the entire disclosure of each of which is incorporated herein by reference.

BACKGROUND

1. Field

The disclosure relates to a device and method for providing an edge computing service, and more particularly, to a device and method for providing an edge computing service using a network slice in a wireless communication system.

2. Description of Related Art

In order to meet the demand for wireless data traffic soaring since the 4G communication system came to the market, there are ongoing efforts to develop enhanced 5G communication systems or pre-5G communication systems. For the reasons, the 5G communication system or pre-5G communication system is called the beyond 4G network communication system or post LTE system.

For higher data transmit rates, 5G communication systems are considered to be implemented on ultra-high frequency bands (mmWave), such as, e.g., 60 GHz. To mitigate pathloss on the ultra-high frequency band and increase the reach of radio waves, the following techniques are taken into account for the 5G communication system, beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and reception interference cancellation. There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, the 3GPP, which is in charge of cellular mobile communication standardization, has named the new core network structure 5G core (5GC) and standardized the same to promote the evolution from the legacy 4G LTE system to the 5G system.

5GC may support the following differentiated functions as compared to the evolved packet core (EPC), which is the legacy network core for 4G.

First, 5GC adopts the network slicing function. 5GC is required to support various types of UEs and services. Examples may include enhanced mobile broadband (eMBB), ultra-reliable low latency communications (URLLC), or massive machine-type communications (mMTC).

These UEs/services have different requirements for the core network. For example, the eMBB service may require a high data rate while the URLLC service may require high stability and low latency. Network slicing is technology proposed to meet such various requirements.

Network slicing is a method for creating multiple logical networks by virtualizing one physical network, and the network slice instances (NSIs) may have different characteristics. Therefore, various service requirements may be met by allowing each NSI to have a network function (NF) suited for its characteristics. Accordingly, various 5G services may be efficiently supported by allocating an NSI meeting required service characteristics for each UE.

Second, 5GC may seamlessly support the network virtualization paradigm by separating the mobility management function and the session management function. In legacy 4G LTE, all UEs may receive services over the network through signaling exchange with a single core device called the mobility management entity (MME) in charge of registration, authentication, mobility management and session management functions.

However, in 5G, the number of UEs explosively increases and mobility and traffic/session characteristics that need to be supported according to the type of UE are subdivided. Resultantly, if all functions are supported by a single device, such as MME, the scalability of adding entities for each required function may decrease. Accordingly, various functions are under development based on a structure that separates the mobility management function and the session management function to enhance the scalability in terms of function/implementation complexity of the core equipment in charge of the control plane and the signaling load.

SUMMARY

The present invention relates to a method for providing the subscriber with an edge computing service using a network slice separate per edge computing service provider when a mobile communication operator provides different network slices to a plurality of edge computing service providers through a 3GPP 5G network.

According to an embodiment of the present invention, a UE in a wireless communication system may comprise a transceiver and at least one processor. The at least one processor may be configured to transmit a first request message to request a first server to provide information through the transceiver, receive first information including information related to a plurality of edge computing service providers (ECSPs) and information used to select one from among a plurality of application servers included in the plurality of ECSPs, from the first server through the transceiver, transmit a second request message to request a plurality of second servers corresponding to the plurality of ECSPs to provide second information related to the application servers based on the first information, through the transceiver, receive the second information related to the application servers from the plurality of second servers through the transceiver, and select one from among the application servers based on the first information and the second information.

According to an embodiment of the present invention, a first server in a wireless communication system may comprise a transceiver and at least one processor. The at least one processor may be configured to receive a request message to request to provide information from a UE through the transceiver and transmit first information including information related to a plurality of edge computing service providers (ECSPs) and information used to select one from among a plurality of application servers included in the plurality of ECSPs, to the UE through the transceiver.

According to an embodiment of the present invention, a second server in a wireless communication system may comprise a transceiver and at least one processor. The at least one processor may be configured to receive a request message to request information related to an application server included in the second server corresponding to an edge computing service provider (ECSP) from a UE, through the transceiver and transmit the information related to the application server to the UE through the transceiver.

According to the disclosure, a plurality of edge computing network providers may provide one service provider network with an edge computing service using separate network slices.

BRIEF DESCRIPTION OF DRAWINGS

FIGS. 4A and 4B are flowcharts illustrating a method for performing communication by a UE, an MNO, and an ECSP to support edge computing according to the first embodiment of the disclosure;

FIGS. 8A and 8B are flowcharts illustrating a method for performing communication by a UE, an MNO, and an ECSP to support edge computing according to the third embodiment of the disclosure;

DETAILED DESCRIPTION

Hereinafter, embodiments of the present invention are described in detail with reference to the accompanying drawings. When determined to make the subject matter of the present invention unclear, the detailed description of the known art or functions may be skipped. The terms as used herein are defined considering the functions in the present disclosure and may be replaced with other terms according to the intention or practice of the user or operator. Therefore, the terms should be defined based on the overall disclosure.

Hereinafter, the base station may be an entity allocating resource to terminal and may be at least one of eNodeB, Node B, base station (BS), radio access network (RAN), access network (AN), RAN node, wireless access unit, base station controller, or node over network. The terminal may include UE (user equipment), MS (mobile station), cellular phone, smartphone, computer, or multimedia system capable of performing communication functions. According to the present invention, downlink (DL) may refer to a wireless transmission path of signal transmitted from the base station to the terminal, and uplink (UL) refers to a wireless transmission path of signal transmitted from the terminal to the base station.

Although a post-LTE system is described below in connection with embodiments of the present invention, as an example, embodiments of the present invention may also apply to other communication systems with similar technical background or channel form. Further, embodiments of the present invention may be modified in such a range as not to significantly depart from the scope of the present invention under the determination by one of ordinary skill in the art and such modifications may be applicable to other communication systems (e.g., LTE or LTE-A systems).

Figure 1:
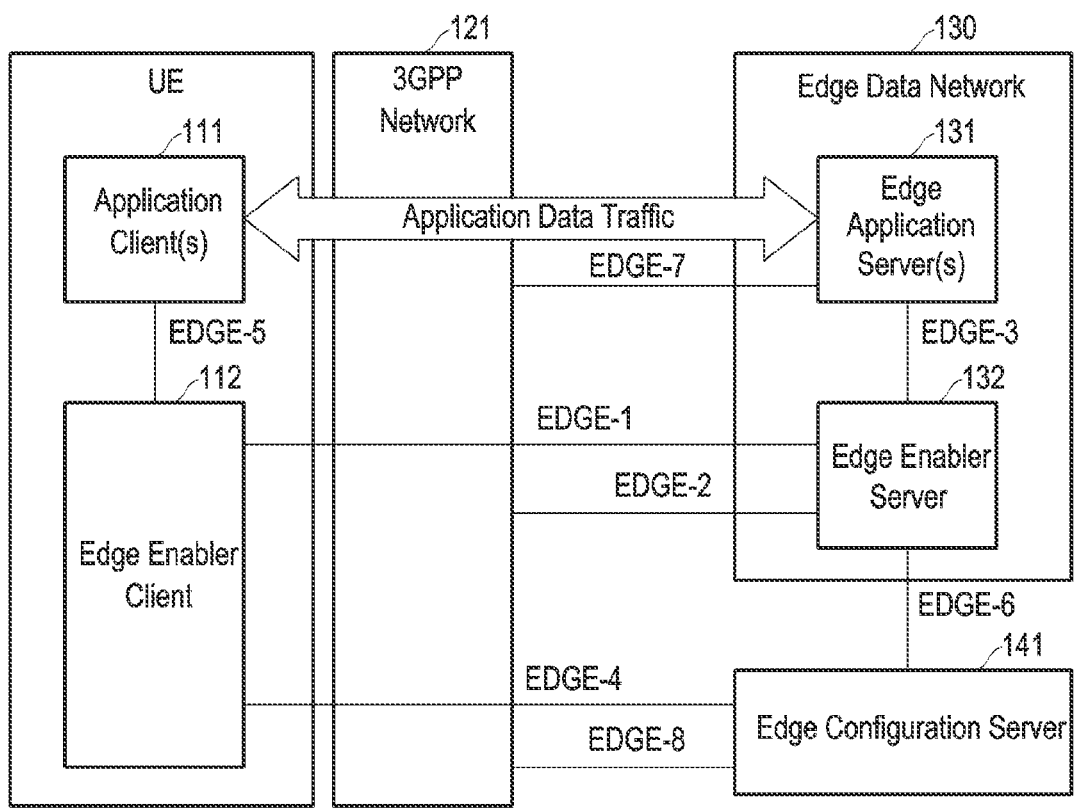
FIG. 1 illustrates an application network structure and interface for supporting edge computing according to an embodiment of the disclosure.

FIG. 1 illustrates an application network architecture and interface for supporting edge computing according to an embodiment of the disclosure.

Referring to FIG. 1, a user equipment (UE) may include at least one application client (AC) and an edge enabler client (EEC). The application client may be an application-level client for providing to the user when an edge computing service is provided.

Further, the UE may include a mobile terminal (not shown in FIG. 1) to communicate with another wireless communication network, e.g., at least one or two or more mobile communication networks.

The 3GPP network is illustrated as a representative of mobile communication networks, and may include, e.g., an EPC and/or a 5GC. The 3GPP network may include base stations that communicate with the UE directly over the air and may include a higher core network configuration. When the 3GPP network includes a 5GC, it may include an access and mobility management function (AMF), a session management function (SMF), a policy control function (PCF), and a user plane function (UPF).

Further, when having an EPC as a core network, it may include network nodes corresponding to the 5GC.

Edge data networks may be implemented through a network slicing technique, and all edge data networks may be configured in the same form. A configuration of edge data network A is described as an example, which may include an edge hosting platform and may include an edge enabler server, an edge application server, and an orchestrator for the edge hosting platform. The edge enabler server may include an edge enabler client manager, an edge enabler platform, and an edge enabler API server.

Network functions may be defined as follows, some of which are illustrated in FIG.

3GPP network 121: may include a 3GPP radio access network (RAN) and a core network.

One or more edge data networks 130: are data networks of 5G core network or packet data networks of EPC network and may be data networks including functions for providing an edge computing service, such as an edge hosting platform edge enabler server.

UE application or application Client 111: is an application program operating on the mobile operating system of the UE and may be identified by OSId or OSAppID in the 5G core network.

One or more application servers or edge applications 131: are application server programs running on a virtualization container or a virtual machine (VM) image operated on an edge hosting environment and may be server programs executed as the VM image is instantiated and may be called edge application servers (EASs).

Edge data network configuration server 141: is a server that provides configuration information about the edge data network to the UE, and may be an initial access server from which the UE may receive configuration information for using the MEC service and be called an edge configuration server (ECS).

Edge hosting platform: may be platform software including a virtualization layer that may execute a plurality of edge application programs. In the disclosure, edge hosting platform may be used as the same concept as edge hosting environment.

Orchestrator for edge hosting platform: may be a management system that manages the lifecycle for edge application programs running on the edge hosting platform and manages the edge hosting platform. It may perform the function of the orchestrator defined in the European telecommunication standards institute management and network operation (ETSI MANO).

Edge enabler server (EES) 132: A server for providing an edge computing service and may be a server that provides the UE with a list of application programs available on the edge hosting platform (edge enabler client manager), manages configuration information about the edge application programs operated on the edge computing hosting platform, and provides an API for the function provided from the 3GPP network to the edge application programs.

Edge enabler client 112: may be a software module of the UE and may be a software agent having functions for providing an edge computing service. Authentication function for the UE to access the edge computing server: may be a software agent by which the UE receives the information provided from the edge hosting platform while interworking with the edge enabler server, performs a routing necessary for the UE application program, and provides information to the UE application program.

The disclosure may disclose an application network structure and method for providing two scenarios, as follows, and implementing the same for a service provider to install a flexible edge network.

The application network architecture for supporting edge computing as shown in FIG. 1 may be managed by a separate edge computing service provider from the mobile communication service provider, and there may be a plurality of separate edge computing service providers in one mobile communication service provider network. The application network architecture for supporting edge computing as shown in FIG. 1 may support the service provider's configuration.

The application network architecture shown in FIG. 1 may support a plurality of edge computing service providers in one mobile communication network. The application network architecture may transfer a plurality of edge computing service providers available in one mobile communication network and configuration information for accessing the edge computing network installed by the service provider to the UE.

The application network architecture shown in FIG. 1 may transfer an edge network service provider selected by the mobile communication service provider among the plurality of edge computing service providers present in one mobile communication network and configuration information for accessing the edge computing network set by the selected edge network service provider to the UE.

First Embodiment

In the first embodiment, a network slice is configured for the mobile communication provider to provide the EAS, ECS and EES managed by the edge computing service provider (ECSP) through a different network slice per ECSP. When a service is provided through the EASs provided by a plurality of ECSPs to the same application client (AC), the mobile network operator (ECS) operated by the mobile communication provider transfers single network slice assistant information (S-NSSAI) per ECSP to the UE.

Figure 2:
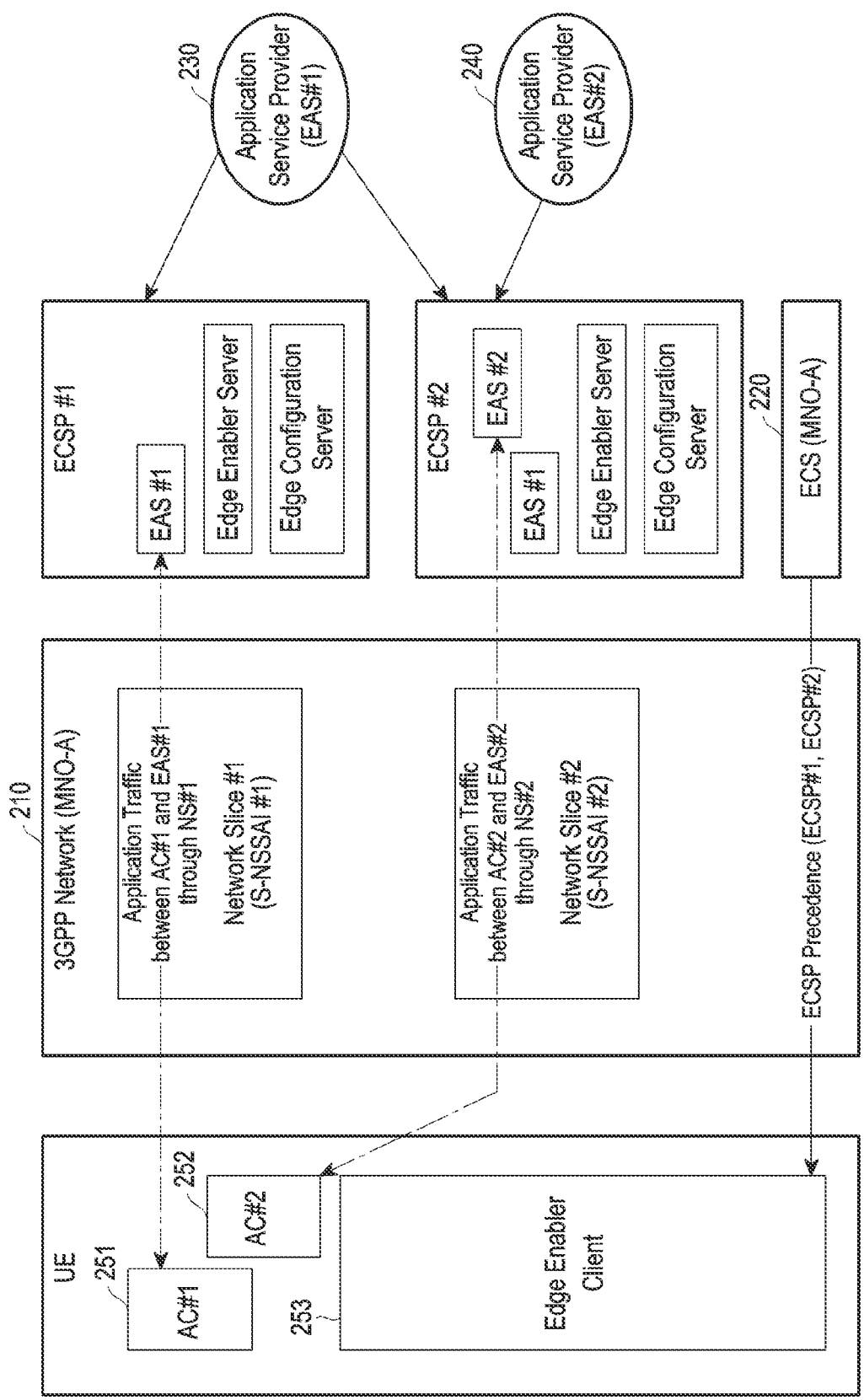
FIG. 2 illustrates an application network structure for supporting edge computing according to a first embodiment of the disclosure.

FIG. 2 illustrates an application network structure for supporting edge computing according to a first embodiment of the disclosure.

FIG. 2 illustrates a 3GPP network 210 and an ECS 220 deployed by a mobile communication provider MNO-A. In FIG. 2, two edge computing service providers ECSP #1 and ECSP #2 are deployed. Each of the two edge computing service providers logically includes one ECS, a plurality of EESs, and a plurality of EASs to which the respective EESs provide information. Further, in the example of FIG. 2, two application service providers 230 and 240 are shown. The first application service provider 230 provides EAS #1 to ECSP #1 and ECSP #2, and the second application service provider 240 provides EAS #2 to only ECSP #2. The UE has application client #1 251 and application client #2 252 installed and is equipped with an EEC 253. In such a configuration, the mobile communication provider MNO-A may provide the services, provided by ECSP #1 and ECSP #2, through separate network slices. As shown in FIG. 2, the mobile communication provider MNO-A may provide the service, provided by ECSP #1, through network slice #1 identified by the S-NSSAI and provide the service, provided by ECSP #2, through the network slice identified by S-NSSAI #2.

When AC #1 251 of the UE provides a service while exchanging traffic with EAS #1, the UE's EEC 253 may gather the addresses for the plurality of EAS #1's installed on the plurality of ECSPs. When the UE's EEC 253 gathers a plurality of EAS addresses, the EEC 253 may select an EAS address according to the precedence of the ECSP. For example, when the ECS 220 of the mobile communication provider sets precedence on the ECSPs, the EEC 253 receives an ECSP list and configuration information in which the precedence on each ECSP is indicated. Subsequently, the EEC 253 receives information about the EES included in each ECSP from the ECS corresponding to each ECSP and gathers information about each EAS #1 from the EES of each ECSP. After the EEC 253 gathers information about a plurality of EAS #1's associated with AC #1 251, the EEC 253 obtains information about the EAS from precedence information about the ECSP received from the ECS (MNO-A) 220 and the information about the EES received from the ECS of each ECSP. When the information about the EES is information received from the ECS of the ECSP, it is assumed that it is the EES provided from the same ECSP and that the EAS received from the EES is instantiated through the edge hosting environment (EHE) of the same ECSP to provide a service. Accordingly, the EEC 253 may know which ECSP has provided the information about the EAS discovered from the ECS information about the ECSP and the ECSP precedence provided from the MNO-ECS 220 and may determine what information it is to selectively provide upon obtaining the information about the plurality of EASs for the same AS according to the ECSP precedence.

Table 1 shows an example of per-AC EAS information obtained from the MNO-ECS, ECSP-ECS, and EES by the EEC.

Figure 3:
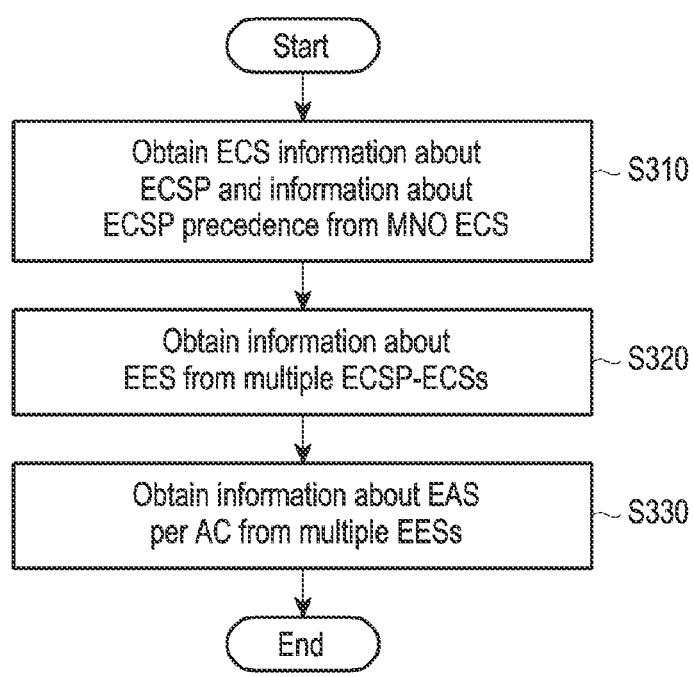
FIG. 3 is a flowchart illustrating a method for obtaining information about an EAS by a UE's EEC to support edge computing according to the first embodiment of the disclosure.

FIG. 3 is a flowchart illustrating a method for obtaining information about an EAS by a UE's EEC to support edge computing according to the first embodiment of the disclosure.

The EEC obtains ECS information for the ECSP and information about ECSP precedence from the MNO ECS (step 310). Step 310 corresponds to step 403 of FIG. 4A. The EEC obtains information about the EES from a plurality of ECSP-ECSs (step 320). Step 320 corresponds to step 408 of FIG. 4B. The EEC obtains information about EAS for each AC from a plurality of EES (step 330). Step 330 corresponds to step 410 or 412 of FIG. 4B. The EEC identifies which ECSP provides the obtained EAS information as shown in Table 1 when EAS selection for AC #1 is needed. When, as in AC #1 of Table 1, a plurality of EASs are respectively provided from a plurality of ECSPs, and precedence determined by the mobile communication provider exists for each ECSP, the EEC selects an ECSP according to the precedence determined by the mobile communication provider and selects information about the EAS provided from the selected ECSP. The selected EAS information may be used to route traffic from AC #1 to the EAS. For example, for the traffic to EAS #1 of AC #1, when the EEC selects ECSP #1 according to the ECSP precedence, the traffic for AC #1 selects a PDU session identified by (S-NSSAI #1, DNN #1).

As in the example of AC #2 of Table 1, the EAS information is obtained from a plurality of ECSPs. However, when EAS information corresponding to AC #2 is obtained only from one ECSP, although the ECSP precedence is the second, the address of EAS #2 provided from ECSP #2 providing the EAS information corresponding to AC #2 may be selected.

Figure 4A:
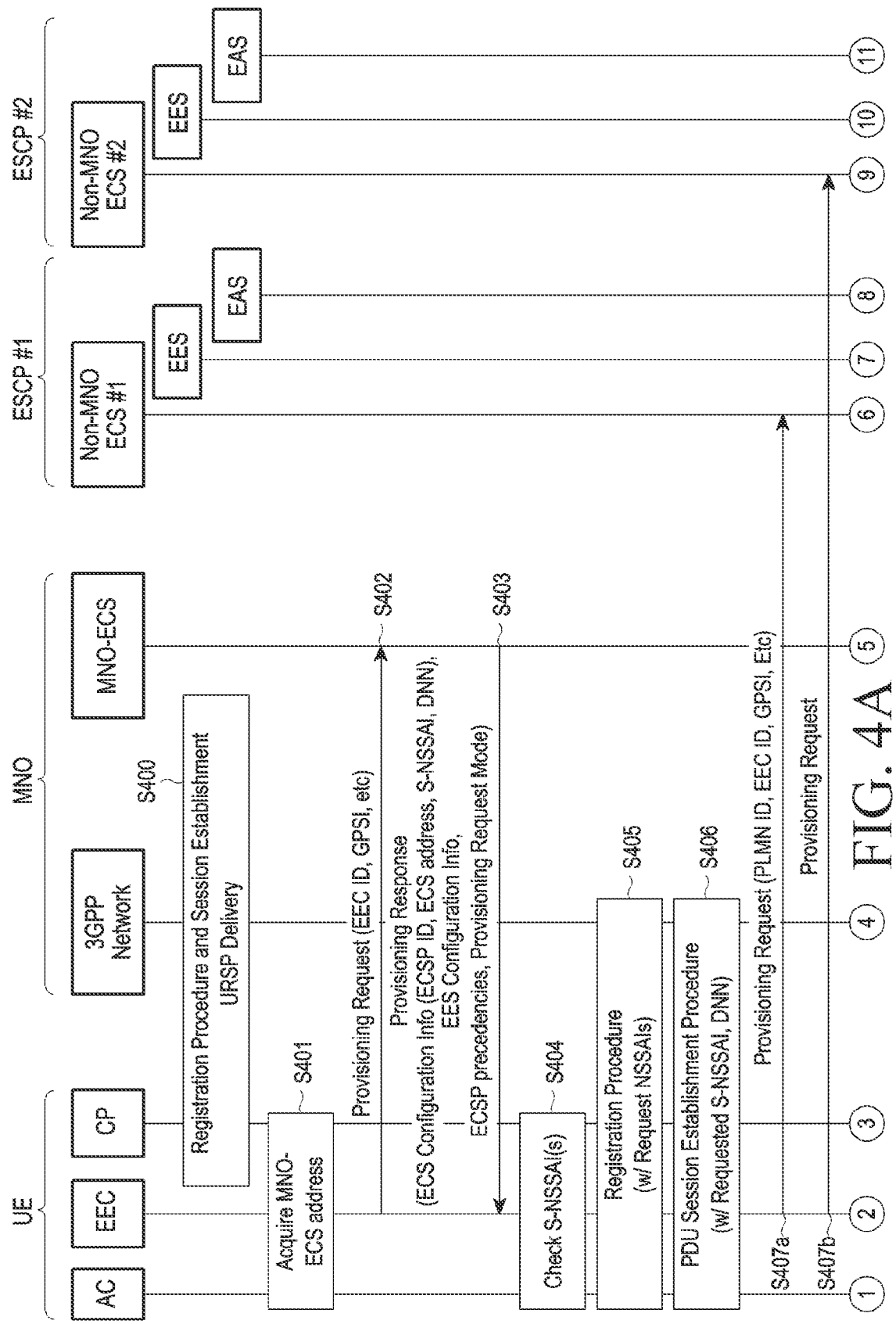

FIGS. 4A and 4B are flowcharts illustrating a method for performing communication by a UE, an MNO, and an ECSP to support edge computing according to the first embodiment of the disclosure.

FIGS. 4A and 4B illustrate a procedure in which in the network configuration shown in FIG. 2, the EEC obtains ECS information about the ECSP, obtains EES information from the ECS, obtains, from the EES, EAS information including the EAS address corresponding to the AC information required to be searched for, and when obtaining a plurality of pieces of EAS information, selects EAS information based on the ECSP precedence information and ECSP information corresponding to the EAS.

Step 400. The communication processor (CP) in the UE may perform a registration procedure in the 5G core network or register in the EPC network. The CP (mobile terminal) performs communication-related functions including the 3GPP modem functions in the UE. In step 400, the EEC may

TABLE 1

| | | | EAS information | | | | |
|---|---|---|---|---|---|---|---|
| Application Client | EAS | EAS address | EES | ECS | ECS Info | ECSP | ECSP Precedence |
| AC#1 | EAS#1 | eas1.ecsp1.com | EES#1 | ECS#1 | (S-NSSAI#1, DNN#1) | ECSP#1 | 1 |
| AC#1 | EAS#1 | eas1.ecsp2.com | EES#2 | ECS#2 | (S-NSSAI#1, DNN#1) | ECSP#2 | 2 |
| AC#2 | EAS#2 | eas2.ecsp2.com | EES#2 | ECS#2 | (S-NSSAI#2, DNN#2) | ECSP#2 | 2 | obtain the type for the 5GC network registered by the CP. Further, when registering in the 5G core network, the CP may determine PLMN identifier information about the registered network. Or, when the CP successfully performs initial access to the EPC network, the CP may determine the identifier of the serving PLMN registered. The CP may transfer the information about the registered CN network and serving PLMN information gathered through step 400 and home PLMN information readable from the USIM of the CP to the EEC through the interface in the UE. In step 400, the UE may obtain information about the currently allowed S-NSSAI.

Step 401. The EEC in the UE obtains the MNO ECS address. This step is described in more detail in the fourth embodiment.

Step 402. The EEC in the UE transmits a provisioning request to the ECS of the MNO. The provisioning request message includes information, such as EEC identifier or GPSI. The provisioning request message may additionally include UE location information about the UE.

Step 403. The ECS of the mobile communication operator (MNO) transfers ECS configuration information to the EEC. ECS configuration information may be included in the provisioning response message. The ECS configuration information may include at least one of the ECSP identifier, the address of the ECS operated by the ECSP, S-NSSAI, and DNN/APN. When a plurality of ECSP information is transferred, the ECS configuration information may further include at least one of per-ECSP precedence information or provisioning request mode information. The message transferred by the MNO-ECS to the EEC in step 403 may include EES configuration information. The ECS configuration information may additionally include at least one of the ECSP identifier, S-NSSAI, data network name (DNN)/access point name (APN), EES address, and the service area of EES or identifier information indicating the service area.

Step 404. The EEC identifies whether the S-NSSAI included in the provisioning response message is the currently allowed S-NSSAI. In other words, the EEC identifies whether the S-NSSAI included in the provisioning response message is included in the list of currently allowed S-NSSAI obtained in step 400.

Step 405. If the S-NSSAI included in the provisioning response message is not the currently allowed S-NSSAI, the 3GPP network registration procedure is performed by including the S-NSSAI included in the received provisioning response message in the request S-NSSAI.

Step 406. If a PDU session for the received S-NSSAI and DNN is not currently created, a PDU session is created.

Step 407. The EEC configures the activated ECSP and the ECS list corresponding to the ECSP and transmits a provisioning request to each activated ECS. The provisioning request message may include, e.g., serving PLMN ID, home PLMN ID, EEC ID, and GPSI. The provisioning request message may include an application profile.

Step 408. The ECS receiving the provisioning request creates and transmits a provisioning response message by referring to the AC profile and area information in response to the request of the EEC. The EEC receiving the provisioning response selects an EES.

Step 409. The EEC transmits a registration request message to the EES.

Step 410. The EEC receives an EEC registration response message from the EES. The registration response message may include an available AC list.

Step 411. The EEC transmits an EAS discovery request message to one or more EESs according to the UE's triggering condition.

Step 412. The EEC receives the EAS discovery response message from one or more EESs. The EAS discovery response message may include a plurality of EAS addresses.

Step 413. When receiving addresses for a plurality of EASs for one AC, the EEC selects one EAS according to the ECSP precedence received in step 403. The UE's EEC may determine the S-NSSAI transferring traffic according to the ECSP precedence (or preference) when there is no URSP rule matching the traffic from the application client to the EAS.

Step 414. The EEC in the UE routes the traffic, directed from the AC to the EAS, to a proper interface I/F. One or more interfaces each may correspond to a PDU session.

Second Embodiment

Figure 5:
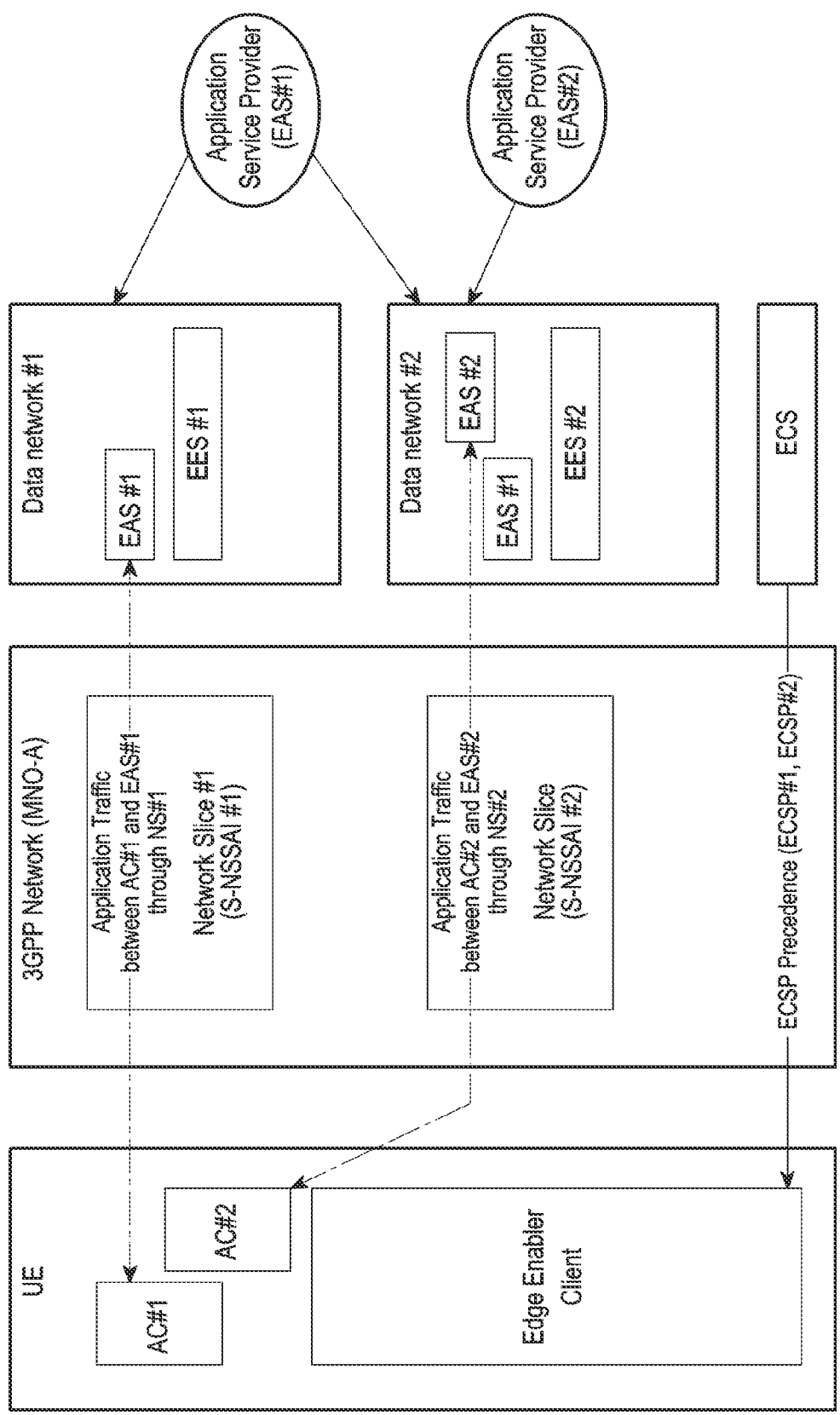
FIG. 5 illustrates an application network structure for supporting edge computing according to a second embodiment of the disclosure.

The second embodiment describes a method for selecting an EAS based on EES precedence information when the EEC receives a plurality of EASs. One mobile communication operator may deploy a plurality of EESs in the respective network slices as shown in FIG. 5. When two network slices are present, two data networks which are accessible through the respective network slices are present, and each data network has an EES having information about a list of EASs provided from each data network. The EES manages information about the EAS that may be executed through an edge hosting environment provided by a data center or a data center per area. The EESs may be provided by different ECSPs or by the same ECSP.

FIG. 5 illustrates an application network structure for supporting edge computing according to a second embodiment of the disclosure.

FIG. 5 illustrates two application service providers. The first application service provider provides EAS #1 to data network #1 and data network #2, and the second application service provider provides EAS #2 to data network #2. The UE has application client #1 and application client #2 installed and is equipped with an EEC. In this configuration, the mobile communication operator may provide each of the services, provided from data network #1 and data network #2, through a separate network slice or data network provided from the 5G core network. As shown in FIG. 5, the mobile communication provider MNO-A may provide the service, provided by data network #1, through network slice #1 identified by the S-NSSAI and provide the service, provided by data network #2, through the network slice identified by S-NSSAI #2. Each of data network #1 and data network #2 may be used to distinguish services provided by separate ECSPs. Further, data network #1 and data network #2 shown in FIG. 5 may correspond to the edge data network 130 shown in FIG. 1. The edge data network may be a local data network.

When AC #1 of the UE provides a service while exchanging traffic with EAS #1, the UE's EEC may gather the addresses for the plurality of EAS #1's installed on the plurality of ECSPs. When the UE's EEC gathers a plurality of EAS addresses, the EEC 253 may select an EAS address according to the precedence of the EES. For example, when the ECS server of the mobile communication provider sets precedence on EES #1, the EEC receives an EES list and configuration information in which the precedence on each EES is indicated. Information about each EAS #1 is gathered from the EES for each ECSP. Thereafter, the EEC gathers information about the plurality of EAS #1's associated with AC #1 from the plurality of EESs, and then, the EEC receives precedence information about the EES from the ECS and obtains EAS information from the EES. The EAS information received from the EES is assumed to be instantiated through the edge hosting environment (EHE) present in the same data network as the EES to provide a service. Accordingly, the EEC may know which EES has provided the EAS received from the EES and the EES precedence provided from the ECS and may determine what information it is to selectively provide upon obtaining the information about the plurality of EASs for the same AC according to the EES precedence.

Table 2 shows an example of per-AC EAS information obtained from the EES by the EEC.

TABLE 2

| Application Client | EAS | EAS address | EES | EES Info | EES Precedence |
|---|---|---|---|---|---|
| AC#1 | EAS#1 | eas1.ecsp1.com | EES#1 | (S-NSSAI#1, DNN#1) | 1 |
| AC#1 | EAS#1 | eas1.ecsp2.com | EES#2 | (S-NSSAI#1, DNN#1) | 2 |
| AC#2 | EAS#2 | eas2.ecsp2.com | EES#2 | (S-NSSAI#2, DNN#2) | 2 |

Figure 6:
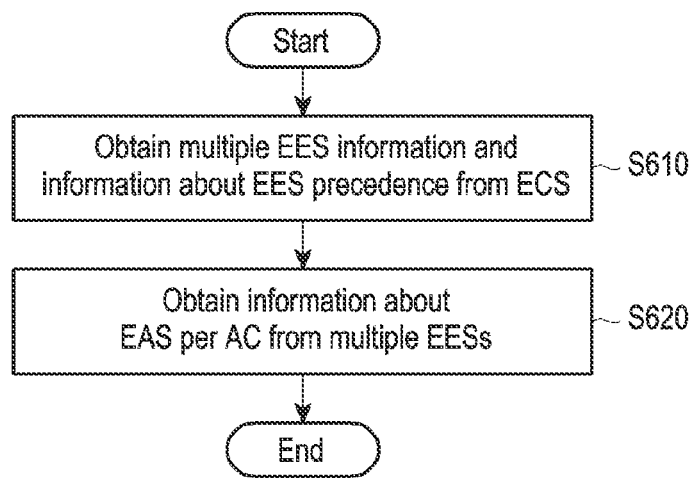
FIG. 6 is a flowchart illustrating a method for obtaining information about an EAS by a UE's EEC to support edge computing according to the second embodiment of the disclosure.

FIG. 6 is a flowchart illustrating a method for obtaining information about an EAS by a UE's EEC to support edge computing according to the second embodiment of the disclosure.

The EEC obtains information about a plurality of EES information and EES precedence information from the ECS (step 610). Step 610 corresponds to step 703 of FIG. 7A. The EEC obtains information about EAS for each AC from a plurality of EES (step 620). Step 620 corresponds to step 710 or 712 of FIG. 7B. The EEC identifies which EES provides the obtained EAS information as shown in Table 2 when EAS selection for AC #1 is needed. When, as in AC #1 of Table 2, a plurality of EASs are respectively provided from a plurality of ECSPs, and precedence determined by the mobile communication provider exists for each EES, the EEC identifies the precedence for the EESs according to the precedence determined by the mobile communication operator and obtains information about the EAS provided by the EES ordered by the precedence. Accordingly, the EAS having the highest precedence may be selected. Or, information about a plurality of EASs may be transferred to the AC. The EAS information may be used to route traffic from AC #1 to the EAS. For example, for the traffic to EAS #1 of AC #1, when the EEC selects EES #1 according to the EES precedence, the destination address for the traffic for AC #1 may be EAS #1, so that the PDU session identified by (S-NSSAI #1, DNN #1) providing EAS #1 may be selected. As in the example of AC #2 of Table 2, when the EAS information is obtained from the plurality of EESs, but EAS information corresponding to AC #2 is obtained from only one EES, although the EES precedence is the second, the address of EAS #2 provided by EES #2 may be selected and, in this case, the PDU session identified by (S-NSSAI #2, DNN #2) may be selected for EAS #2.

Figure 7A:
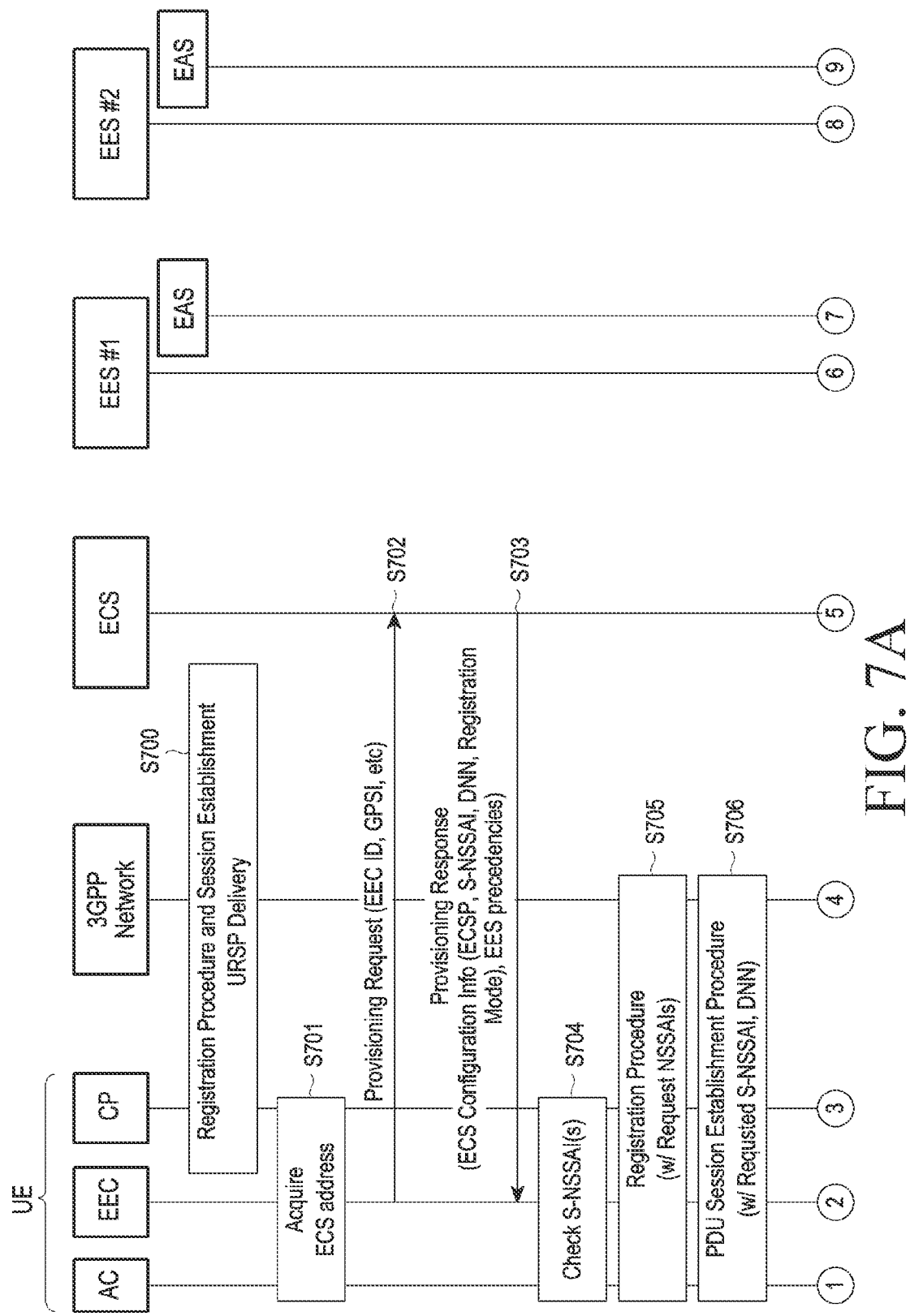
FIGS. 7A and 7B are flowcharts illustrating a method for performing communication by a UE, an MNO, and an ECSP to support edge computing according to the second embodiment of the disclosure.
Figure 7B:
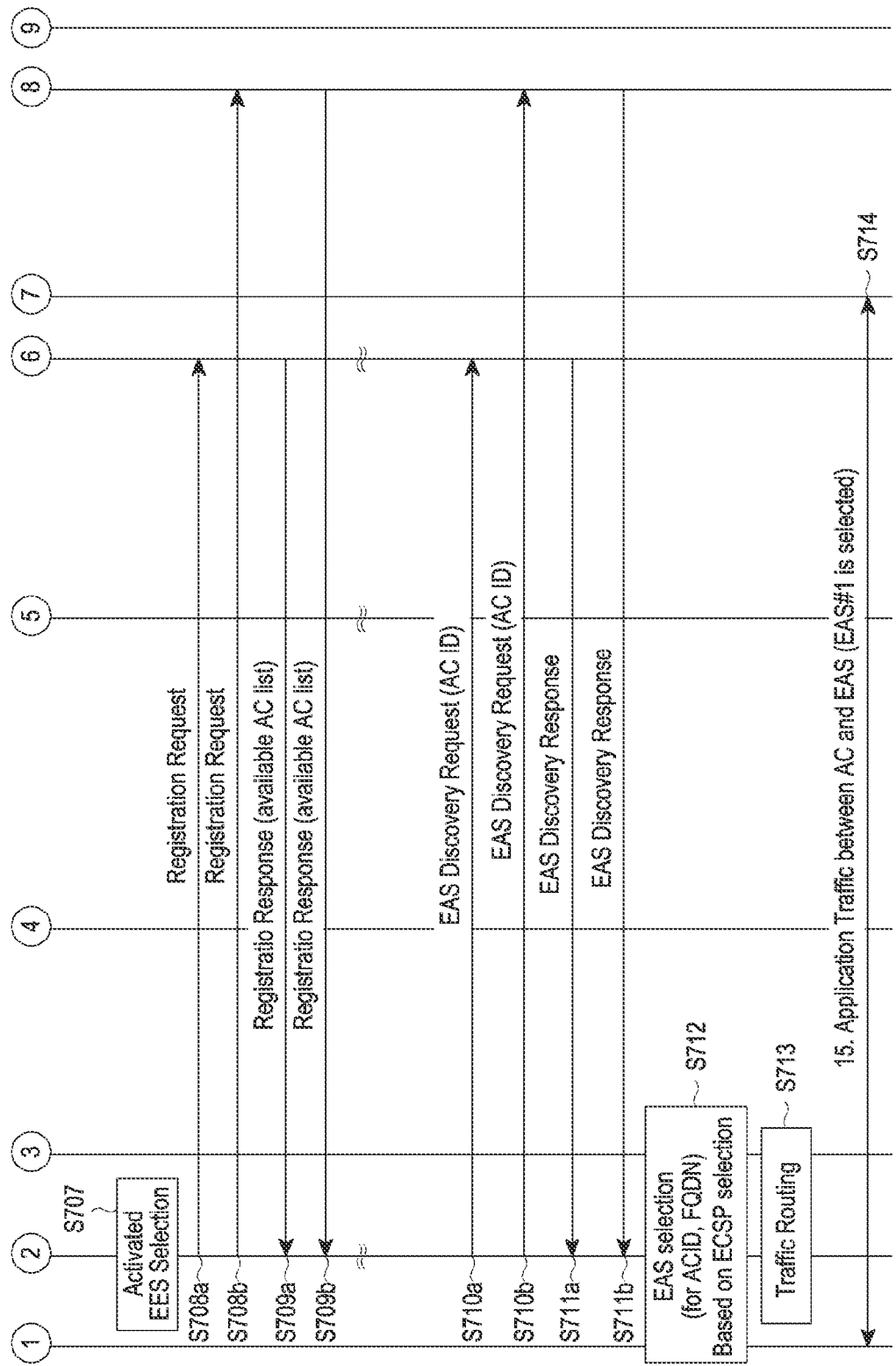

FIGS. 7A and 7B are flowcharts illustrating a method for performing communication by a UE, an MNO, and an ECSP to support edge computing according to the second embodiment of the disclosure.

FIGS. 7A and 7B illustrate a procedure in which in the network configuration shown in FIG. 5, the EEC obtains information about the EES from the ECS, obtains EES information from the ECS, obtains, from the EES, EAS information including the EAS address corresponding to the AC information required to be searched for, and when obtaining a plurality of pieces of EAS information, selects EAS information based on the EES precedence information corresponding to the EAS.

Step 700. The same procedure as in step 400 of FIG. 4A is performed.

Step 701. The address of the ECS is set in the EEC. A method for setting the ECS address in the EEC is separately described in the fourth embodiment.

Step 702. The EEC transmits a provisioning request. The provisioning request message may include information, such as EEC identifier, UE's identifier, or UE's location. The provisioning request message may include the type of the registered core network from the information received from the MT, e.g., 5GC or EPC information, serving PLMN identifier, and home PLMN identifier information.

The EEC may additionally transfer EEC self-configuration-based information, e.g., EEC type information, such as the manufacturer's embedded type (or downloadable type). The EEC may additionally transfer, to the ECS, a list of the ACs currently installed on the EEC, list of edge-aware ACs, and application profile information required by each AC.

The ECS receives, from the EEC, EEC type, 3GPP core network type, location of UE, service area where the UE is located, current serving PLMN information of the EEC, and home PLMN information. Further, the ECS receives information about the application profile list required by each AC and the list of ACs installed on the EEC.

The ECS determines whether to obtain location information through 3GPP subscriber information as the registered core network type, home PLMN information, serving PLMN information, and UE identifier (GPSI) information provided by the EEC. For example, when location information has not been transmitted by the EEC but is required to provide information to the EEC, the ECS may invoke a service API to request the UE's location information from the 3GPP core network to obtain the location information about the UE equipped with the EEC in the 3GPP core network.

Or, the ECS may request AF traffic influence from the 3GPP core network to identify information (e.g., information about the DNAI or SMF or UPF service area) about the service area according to the topology information about the 3GPP network associated with the UE's location through an interface directly transferred to the NEF or SCEF or AMF of the 3GPP core network to determine what edge computing service area (e.g., EDN service area or EES service area) the EEC currently belongs to. The ECS may subscribe to a user plane event notification service.

The ECS, receiving the provisioning request, requests subscription information, location information, service available information, and traffic influence information about the UE from the 3GPP core network and receives a response message thereto from the 3GPP core network, and the ECS performs authentication when authentication for the subscriber is needed as per the service provider's policy. The ECS receives necessary information from the 3GPP core network. If authentication is successfully performed, the ECS determines configuration information about the second ECS server (i.e., ECS per ECSP) which is to be transferred to the EEC according to the information received from the 3GPP core network. If a plurality of EES are determined based on the information received from the EEC by the ECS and the information received from the 3GPP core network, the ECS may transmit, to the EEC, an operation mode for determining the UE operation for a discovery mode and an EES registration mode based on information about the operation mode, such as registration mode and discovery mode, received from the EES. For example, the EES registration mode indicates whether the registered EES is a stateful EES which always maintains the state of the EEC or a stateless EES which does not maintain the state for the EEC. Accordingly, if the EES registration mode indicates the stateful EES, the EEC performs EES registration and, if the EES registration mode indicates the stateless EES, the EEC does not perform registration to the EES.

The ECS determines the precedence of the EES as follows. The ECS determines the EES profile precedence to meet the requested application profile, considering the list of the edge computing provider to which the corresponding subscriber explicitly has subscribed in the subscription information received from the 3GPP core network or the mobile communication provider's own settings. If the ECS determines the precedence of the EES, the EES transfers information about the EES and the precedence information to the EEC. When the type of the core network included in the provisioning request is 5GC, the ECS is operated by the mobile communication provider, and information about the DNN information and S-NSSAI is preset, the EEC may include and transmit the S-NSSAI and DNN information. Or, the EEC may identify subscribed NSSAI information allowed in the subscription information about the UE and subscribed DNN information and include and transmit the subscribed S-NSSAI and DNN information. The ECS may identify the UE's location information sent from the UE or the UE's location information in the 3GPP core network and select the EEC list allowable in the place where the UE is currently located.

Step 703. The ECS transmits a provisioning response message to the EEC. The EES configuration information included in the provisioning response message may include the following.

1) S-NSSAI and DNN information provided by the MNO
2) Information for the EEC to access the EES. For example, the address or URL of the EES
3) The EES registration mode is an indicator indicating whether the EEC performs the EES registration procedure.

The EEC receives configuration information for one or more EESs from the ECS.

Step 704. The received EES configuration information may include S-NSSAI and DNN information provided by the MNO.

Step 705. The EEC may receive S-NSSAI information and may modify the UE local configuration information based on the received S-NSSAI information. The EEC identifies whether the S-NSSAI received through the mobile terminal (communication processor) is currently allowed S-NSSAI. If the S-NSSAI received by the EEC or CP is not the S-NSSAI allowed in the currently allowed 5GC, the EEC may perform a registration procedure to request the CP to access a new slice to access the EES received in the provisioning response. The UE may include the received S-NSSAI in the request NSSAI and transmit a registration request message to the 5G core network. When registered in the 5GC, the EEC identifies a list for the currently generated PDU session.

Step 706. The EEC identifies whether the S-NSSAI and DNN information included in the configuration information about the EES included in the provisioning response is for the currently generated PDU session. If the EEC has determined to access the EES, but a PDU session identified by the S-NSSAI and DNN included in the access information about the EES is not generated, the EEC performs a procedure to request the CP to generate a PDU session that has new S-NSSAI and DNN as parameters.

Step 707. When the S-NSSAI and DNN received from the ECS are available, and the UE is currently in the service area received from the ECS, the EEC adds the corresponding EES to the available EES list.

Step 708. When the EEC may access the EES, and the EES registration mode is the stateful EES which maintains the state of the EEC, the EEC transmits a registration request message to the EES. When the EES registration mode is the stateless EES which does not need to maintain the state of the EEC, the EEC does not perform a registration procedure on the EES. When a plurality of EESs are in the available EES list, the EEC performs a registration procedure on the plurality of EESs.

Step 709. The EEC receives a registration response message from the plurality of EESs.

Step 710. When one or more conditions as follows in the UE are met, the EEC transmits the EAS discovery request message to the plurality of EESs, performing an EAS discovery procedure.

1) When a new application client is installed on the UE
2) When the state of the UE's application program is changed, e.g., when it is changed into an app execution state due to the user's motion, when the app user screen is moved to the front surface or rear surface due to the user's motion or when folded or unfolded
3) When the UE's application program explicitly requests EAS discovery,
4) When the UE's application program requests DNS query
5) When traffic from the UE's application program to the EAS is detected,
6) When the UE's location in 3GPP is moved so that information about the camping base station is changed, and a change in the service area is thereby detected,
7) When the EEC is explicitly notified of the UE's movement by the EAS, and receives an instruction to restart the EAS discovery procedure
8) When the lifetime for the information about the EAS retained by the EEC expires or reaches a specific threshold or more The EEC may further include a cause of discovery request in the EAS discovery request message and transfer it. The cause of discovery request may include the following identifiers or indicators.

1) Application program event: When the request is made due to an event related to the application program, an identifier for the application program, i.e., the application client, may be included and transferred to the EES.
2) Request for all EAS information: The EEC may include information about all allowed EASs in the EAS discovery request message and transmit it.
3) New registration EAS information request: The EEC may include an indicator to request information about the EAS newly registered after the last request in the EAS discovery request message and transmit it.

Step 711. The EES may transfer the EAS information corresponding to the discovery request cause included in the discovery request message received from the EEC to the EEC.

1) In the case of the application program event, the EES EAS information associated with the corresponding application client to the EEC.

2) In the case of a request for all EAS information, the EES transfers a list of EASs available to the EEC to the EEC.

3) In the case of a new registration EAS information request, the EES transmits information about an EAS newly registered after the last request message to the EEC.

When a plurality of EES are available, the EEC sequentially transmits the EAS discovery according to the EES precedence received in step 703. If the EEC receives information about a proper EAS from the EES, no additional EAS discovery procedure may be performed.

In another embodiment, when a plurality of EESs are available, the EEC performs an EAS discovery procedure per EES and then sort the EAS information received according to the EES precedence received in step 703, and select the EAS received from the EES and having a high precedence.

Step 712. The EEC selects an EAS based on ECSP selection.

Step 713. If the UE lacks the URSP configured (provisioned) from the home PLMN network, the UE selects a data network and the same network slice as the EES corresponding to the selected EAS address.

Step 714. Traffic is exchanged between the EAS and the application client in the UE.

Third Embodiment

In the first embodiment, a method in which the EEC selects an EAS according to the ECSP precedence when a plurality of EASs are available through the precedence for the ECSP has been described and, in the second embodiment, a method in which the EEC selects an EAS according to the EES precedence when a plurality of EASs are available by adopting the precedence for the EES has been described. The third embodiment regards a method for adding various conditions in EAS selection described in the first embodiment or second embodiment.

In the third embodiment, another method in which the EEC selects an EAS when a plurality of EASs are available for one AC is described.

Figure 8A:
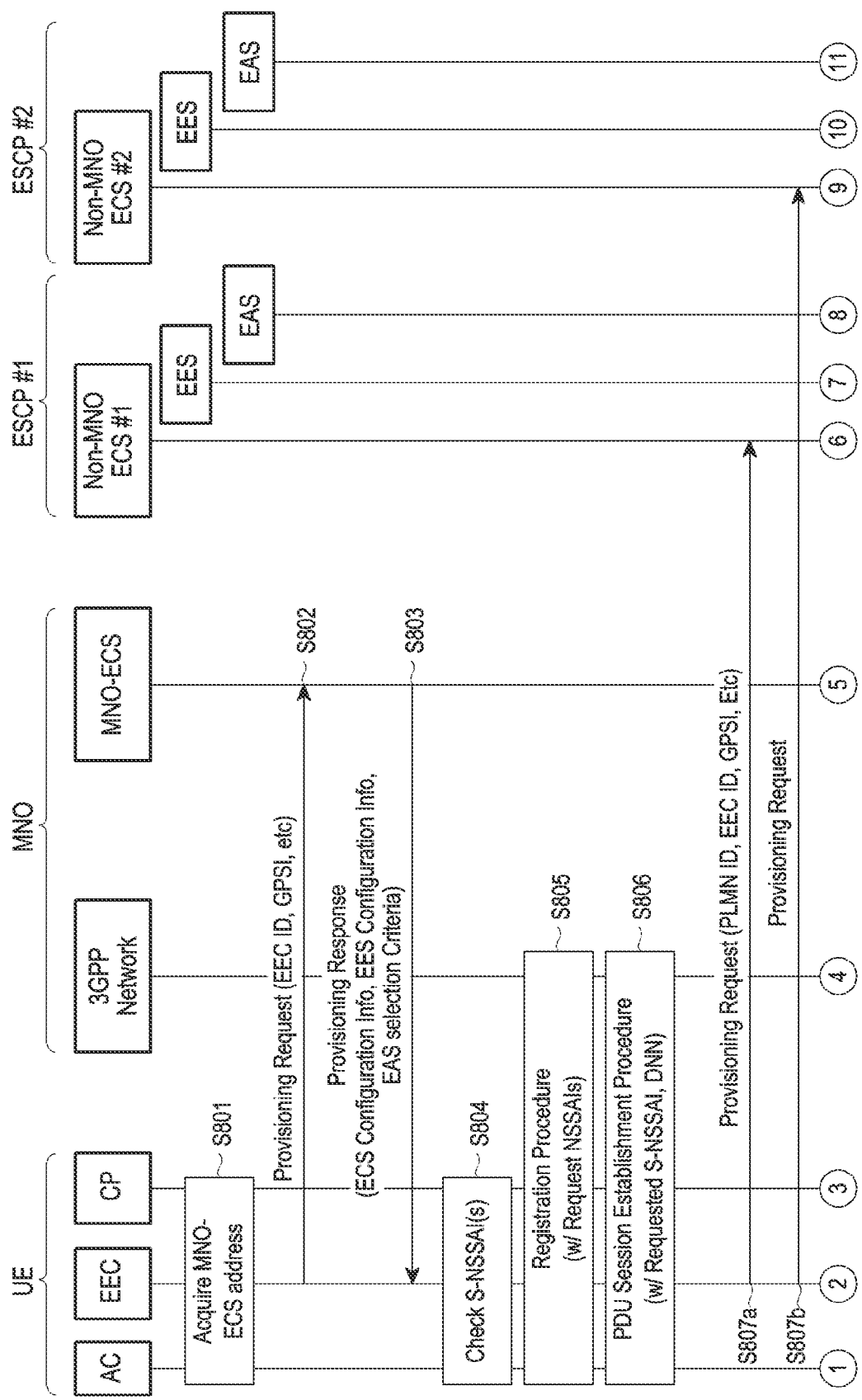

FIGS. 8A and 8B are flowcharts illustrating a method for performing communication by a UE, an MNO, and an ECSP to support edge computing according to the third embodiment of the disclosure.

Step 801. The EEC obtains the ECS address.

Step 802. The EEC transmits a provisioning request to the ECS. The ECS may receive information including at least one of the information received from the EEC (e.g., EEC ID, GPSI, type of registered 3GPP core network, application profile information, AC information list installed on the UE, operating system identifier, or the UE's current location information in the 3GPP network), UE or subscription information (e.g., subscribed slice information (subscribed NSSAI), subscribed DNN/APN information, subscribed ECSP list) in the 3GPP network requested from the 3GPP core network through the subscription identifier received from the EEC, the UE's location information in the 3GPP network (e.g., cell identifier or tracking area identifier), the UE's current location on the session-related network topology (e.g., the UE's IP address IP domain name, or data network access identifier (DNAI) identifier) or information for identifying the same, the UE's edge computing-related profile information (e.g., edge computing service profile identifier, or whether provision of edge computing service is allowed, when LBO is available in the case of roaming, edge computing service level and edge computing subscriber level) and determine EAS selection criteria based on the received information. The following are examples of multiple EAS selection criteria.

1) ECSP precedence prioritized
2) EES precedence prioritized
3) Low-latency EAS prioritized
4) High-bandwidth EAS prioritized
5) High-spec computing power (e.g., CPU/GPU, high-capacity memory/storage) prioritized
6) Profile for application client met
7) When UE is present in the EES or EDN service area, As exemplified above, when a plurality of EAS selection criteria are present, the precedence for the EAS selection criteria may be included and transmitted. For example, the ECS is assumed to simultaneously require the three criteria, 1) low-latency prioritized, 2) high-bandwidth prioritized, and 3) application client profile met. If the policy of low-latency prioritized is the first criterion, and the next is high-bandwidth, and then the application client profile met, the EAS selection criteria provided by the ECS are as in Table 3 below.

TABLE 3

| EAS selection criteria | precedence |
| --- | --- |
| low-latency prioritized | 1 |
| high-bandwidth prioritized | 2 |
| application client profile met | 3 |

For example, if the EAS selection criteria as shown in Table 3 are presented, and it is assumed that a plurality of EASs as shown in Table 4 are discovered for the same AC in the EEC, EAS #1 is selected.

TABLE 4

| | Latency | Bandwidth | Application Client |
| --- | --- | --- | --- |
| EAS#1 | 20 ms | 30 Mbps | not met |
| EAS#2 | 20 ms | 40 Mbps | not met |
| EAS#3 | 30 ms | 30 Mbps | met |

If the EAS selection criteria include only bandwidth prioritized or the precedence for bandwidth prioritized is highest unlike in Table 3, the EEC should select EAS #2 in the discovery result of Table 4.

Or, if AC profile met takes precedence in the EAS selection criteria, the EEC should select EAS #3.

The ECS may determine the policy for the EAS selection criteria from, e.g., information about EEC or the subscriber UE equipped with the EEC, information required by the AC, or the UE subscriber's dynamic subscription information (e.g., remaining data or service level).

Step 803. When the ECS determines selection criteria for the EAS, the ECS transmits information about the EAS selection criteria to the EEC.

Step 804 to step 812 perform the same procedure as step 404 to step 412 of FIG. 4.

In step 813, the EEC selects an EAS that meets the EAS selection criteria received in step 803. If the EEC does not receive the EAS selection criteria in step 803, the EAS selection criteria may follow the selection criteria set by the EEC itself. The selection criteria applied by the operator in the ECS and transferred to the EEC in step 803 have higher precedence than the selection criteria set by the EEC itself.

Fourth Embodiment

In the fourth embodiment, various methods for setting ECS information in EEC are described. Procedures for obtaining ECS configuration information when there is a method for updating or setting a plurality of ECS configuration information in the EEC are described.

Figure 9A:
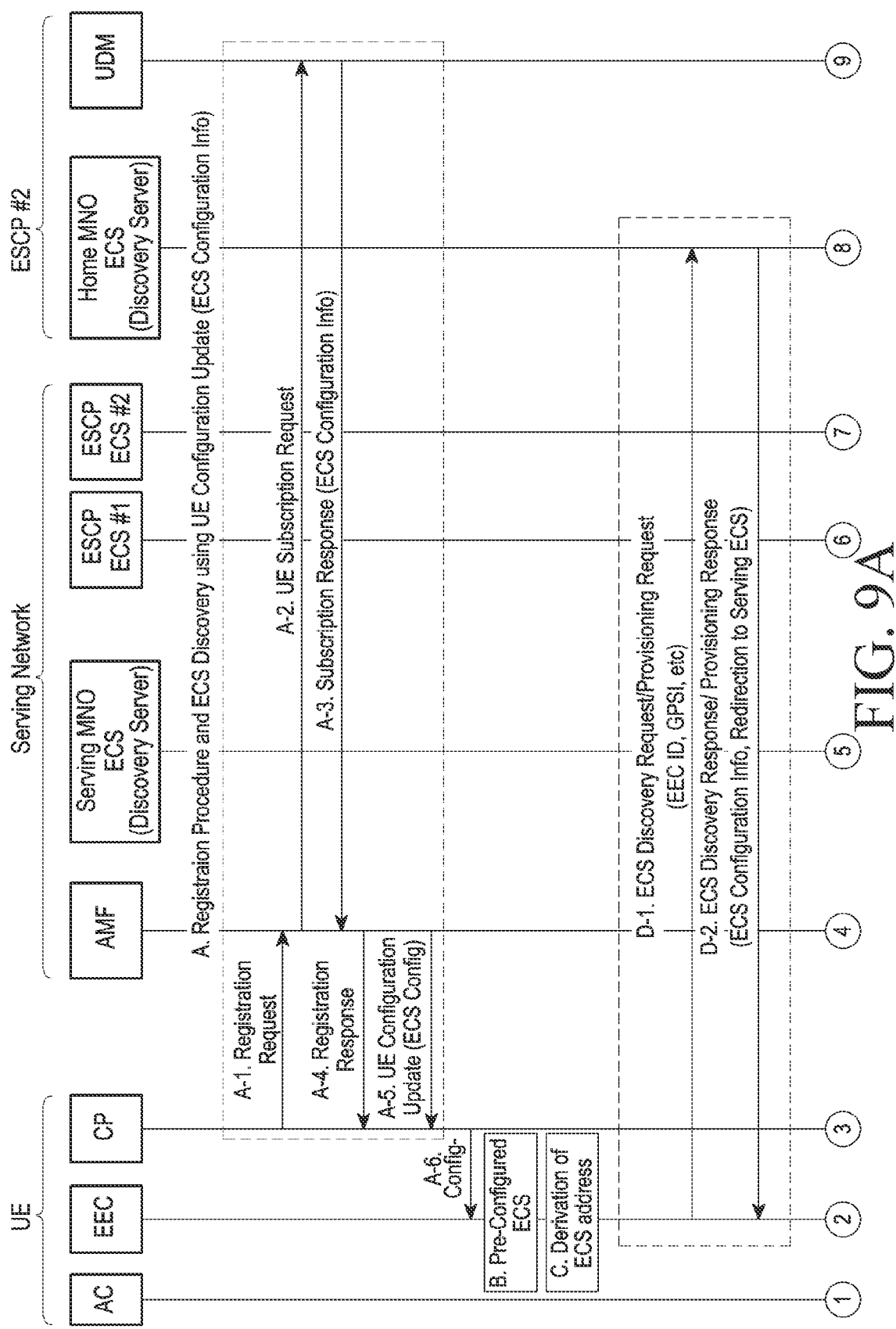
FIGS. 9A and 9B are flowcharts illustrating a method for performing communication by a UE, a serving network, and a home network to support edge computing according to the fourth embodiment of the disclosure.
Figure 9B:
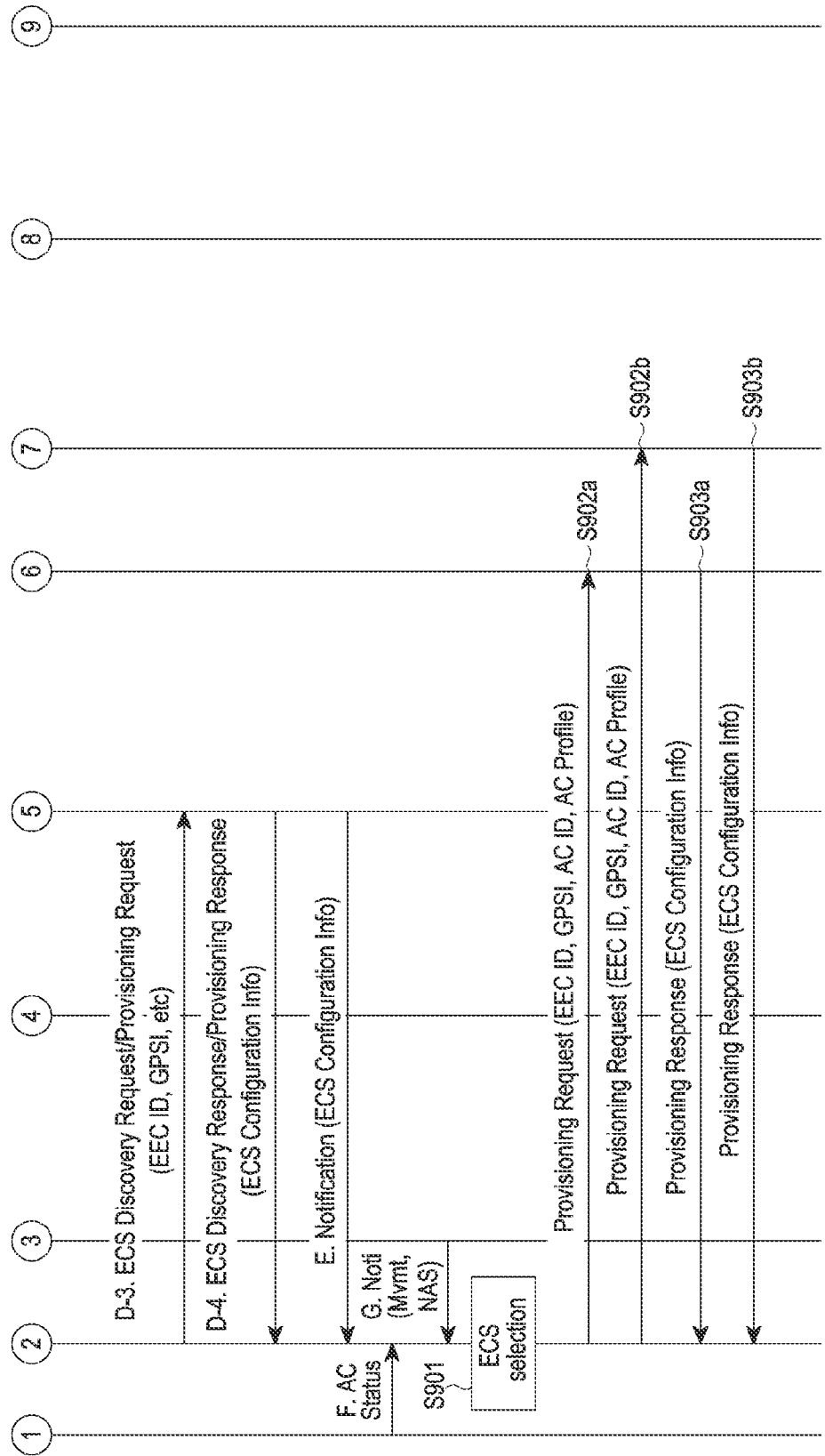

FIGS. 9A and 9B are flowcharts illustrating a method for performing communication by a UE, a serving network, and a home network to support edge computing according to the fourth embodiment of the disclosure.

A. Method for transferring ECS configuration information through a UE configuration update procedure in the 5G core network
B. Use of pre-configured information in EEC
C. Method for deriving ECS address from the home PLMN information stored in USIM Method in which the UE derives ECS address from the currently registered serving PLMN information
D. Method for receiving ECS information per ECSP from the configured ECS When the home PLMN is first accessed, and the serving PLMN is accessed in the case of roaming
E. Method for subscribing to update report service for ECS configuration information in ECS, receiving an ECS configuration information change message from the ECS, and updating ECS information
F. Method for receiving ECS configuration information from the AC profile information included in the application client when application client is installed or executed
G. When updating ECS information from the modem receiving UCU information from the 5G core network.

In relation to procedure A, if the UE powers on, a registration procedure to the 5GC is performed if the 5G core network is available to the CP. Or, the CP performs a registration procedure to the EPC. If registration in the 5GC is performed, after the registration procedure, the 5G core network may provide the ECS configuration information stored in the PCF or UDM to the UE by performing a UE configuration update procedure. The CP receiving the ECS configuration information transfers the ECS configuration information to the EEC.

The EEC receives ECS configuration information from the CP. The EEC may request and receive the ECS configuration information from the CP.

The ECS configuration information received by the EEC has higher precedence than the local configuration information stored in the UE. In other words, if UE update configuration information is not received from the 5GC in procedure B, the EEC may use the local configuration information.

If the EEC lacks the ECS configuration information received from the CP, and there is no ECS configuration information set by the EEC itself, the EEC may derive an ECS address from the home PLMN and serving PLMN information.

The EEC transmits an ECS discovery request message to the home ECS from the home PLMN information extracted from the USIM to the ECS server address provided from the home PLMN. The ECS discovery request message may include and transmit the ECS discovery request indicator in the provisioning request. The home ECS receiving the ECS discovery request may perform EEC authentication and use permit procedure according to the home service provider's policy. If EEC authentication is successfully performed, the home ECS transfers ECS configuration information including the visited ECS address agreed on with the home service provider to the EEC.

If the EEC succeeds in authentication with the home PLMN and receives visited ECS configuration information, the EEC transmits a provisioning request to the visited ECS. When authentication from the home PLMN succeeds, the EEC receives authentication information (credential) from the home PLMN and includes the received authentication information or other authentication information derived from the authentication information in the visited ECS and transmits it.

If the EEC transmits to the home PLMN, but the home PLMN does not respond or access to the home ECS fails, the EEC derives the address for the visited ECS from the registered PLMN information registered in the 5GC or EPC and transmits the provisioning request to the visited ECS. Like the home PLMN transmitted message, a visited ECS request message is transmitted. Upon failing to obtain authentication information from the home PLMN, the EEC transmits a provisioning request that does not include authentication information in the visited ECS.

The visited ECS identifies the home PLMN through the EEC identifier requested by the EEC, GPSI, home PLMN identifier, or visited PLMN identifier. When the visited ECS is unable to identify the UE's authentication information, it transfers a message to reject the provisioning request in response to the provisioning request.

When there is no available ECS information, and a provisioning response is received from neither the home ECS address accessed from the derived address nor the visited ECS address or the provisioning request is rejected, the EEC does not proceed with the subsequent procedures, such as ECS selection or EES selection.

Figure 10:
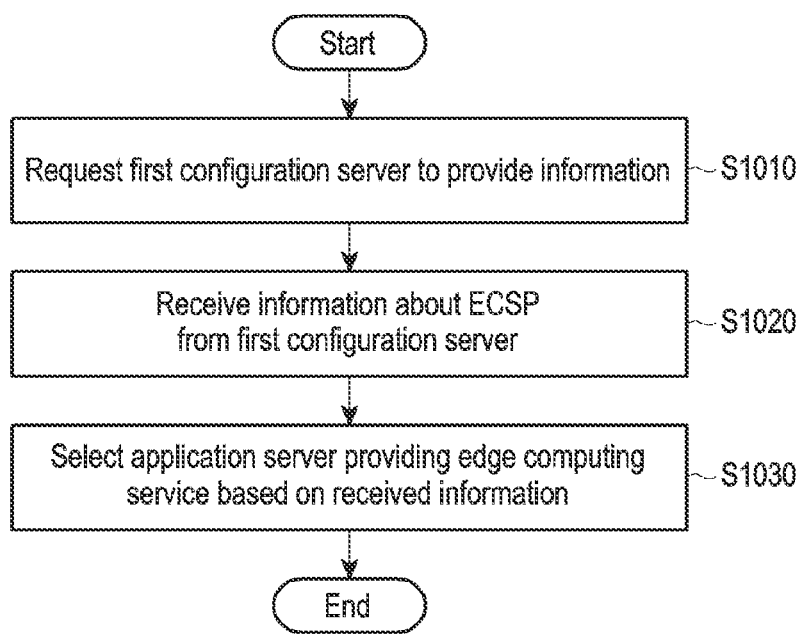
FIG. 10 is a flowchart illustrating a method for selecting an EAS by a UE to use an edge computing service according to an embodiment of the disclosure.

FIG. 10 is a flowchart illustrating a method for selecting an EAS by a UE to use an edge computing service according to an embodiment of the disclosure.

Referring to FIG. 10, a method for receiving an edge computing service by a UE in a wireless communication system may include requesting a first configuration server to provide information (step 1010), receiving information about a plurality of edge computing service providers (ECSPs) from the first configuration server (step 1020), and selecting one or more application servers providing an edge computing service based on the information (step 1030).

The first configuration server may be the ECS of the first to third embodiments. The information provides request may be included and transmitted in a provisioning request message. The application server may be the EAS of the first to third embodiments.

The method of FIG. 10 may further include one or more processes of the first to third embodiments. For example, the method may further include requesting a plurality of second configuration servers corresponding to the plurality of ECSPs to provide information.

Selecting the application server may include determining S-NSSAI based on an ECSP precedence included in the information and selecting the one or more application servers corresponding to the determined S-NSSAI.

The provisioning request message may include conditions which may include whether an area ID of the location of the UE or an application ID is included.

The information may include selection criteria of the application server. The selection criteria may include at least one of, e.g., precedence information about the edge computing service provider, precedence information about the enabler server, low-latency providing application server, high-bandwidth providing application server, application server meeting high-spec, UE's AC profile, and UE's location.

Figure 11:
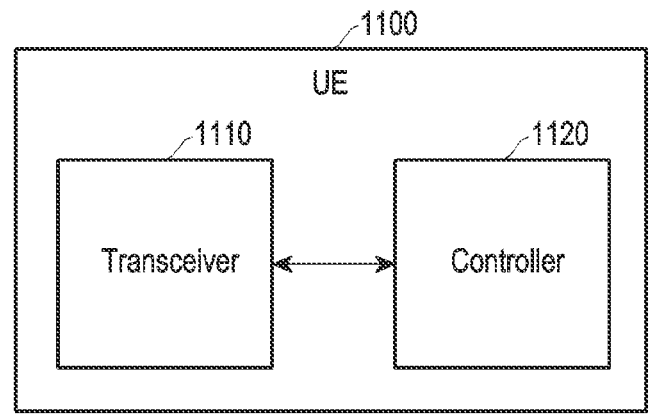
FIG. 11 is a block diagram illustrating a configuration of a UE according to an embodiment of the present invention.

FIG. 11 is a block diagram illustrating a configuration of a UE according to an embodiment of the present invention.

Referring to FIG. 11, a UE 1100 may include a transceiver 1110 and a controller 1120 to communicate with other entities in the wireless communication system.

The transceiver 1110 may transmit and receive signals to/from other network entities, and may include a CP of the UE. The controller 1120 may control the transmission and reception of the transceiver and may include an EEC and AC of the UE.

Figure 12:
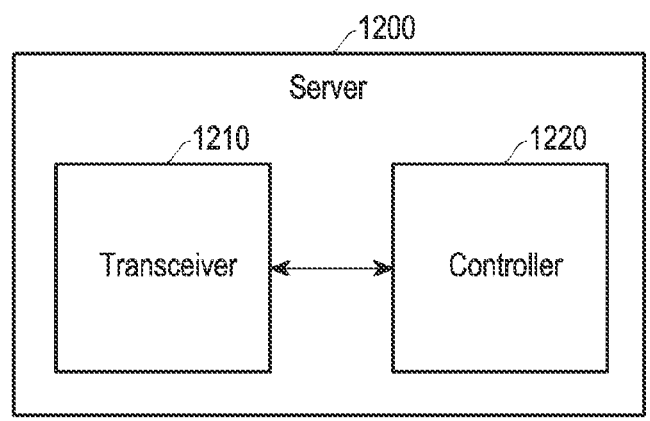
FIG. 12 is a block diagram illustrating a configuration of a server according to an embodiment of the present invention.

FIG. 12 is a block diagram illustrating a configuration of a server according to an embodiment.

The server of FIG. 12 may correspond to, e.g., an ECS, EAS, EES, base station, or AMF or may be a concept encompassing them all.

Referring to FIG. 12, a server 1200 communicating with other entities or the UE in the wireless communication system may include a transceiver 1210 and a controller 1220.

The transceiver 1210 may transmit and receive signals to/from other network entities. The controller 1220 may control the transceiver 1210 and process signals transmitted and received.

According to an embodiment of the present application, a method by a UE in a wireless communication system may comprise transmitting a first request message to request a first server to provide information, receiving first information including information related to a plurality of edge computing service providers (ECSPs) and information used to select one from among a plurality of application servers included in the plurality of ECSPs, from the first server, transmitting a second request message to request a plurality of second servers corresponding to the plurality of ECSPs to provide second information related to the application servers based on the first information, receiving the second information related to the application servers from the plurality of second servers, and selecting one from among the application servers based on the first information and the second information.

According to an embodiment of the present application, the first information may include at least one of edge configuration server (ECS) configuration information, precedence information about each ECSP, precedence information about an edge enabler server (EES) included in each ECSP, or information instructing the UE to register with each EES, and the ECS configuration information may include at least one of an ECSP ID of each ECSP, an ECS address operated by each ECSP, single network slice assistant information (S-NSSAI) about each ECSP, or a data network name (DNN)/access point name (APN) of each ECSP.

According to an embodiment of the present application, selecting one from among the application servers may include selecting S-NSSAI to be used to transfer the UE's traffic from among S-NSSAIs of the ECSP based on the precedence information about each ECSP and selecting the application server corresponding to the selected S-NSSAI.

According to an embodiment of the present application, selecting one from among the application servers may include selecting S-NSSAI to be used to transfer the UE's traffic from among S-NSSAIs of the ECSP based on the precedence information about each EES and selecting the application server corresponding to the selected S-NSSAI.

According to an embodiment of the present application, the request message may include at least one of the UE's location information, an EES identifier (ID), or a generic public subscription identifier (GPSI).

According to an embodiment of the present application, the information used to select one from among the plurality of application servers may include at least one of precedence information about each ECSP, precedence information about an edge enabler server (EES) included in each ECSP, first type precedence information about the application server included in each ECSP, second type precedence information about the application server included in each ECSP, third type precedence information about the application server included in each ECSP, fourth type precedence information about the application server included in each ECSP, or the UE's location information. The first type precedence information may be based on latency, the second type precedence information may be based on bandwidth, the third type precedence information may be based on computing power, and the fourth type precedence information may be based on the UE's application client profile.

According to an embodiment of the present application, selecting one from among the application servers may include selecting the application server based on at least one of the first type precedence information, the second type precedence information, the third type precedence information, the fourth type precedence information, or the UE's location information.

According to an embodiment of the present application, the second request message may include at least one of a public land mobile network identifier (PLMN ID), a home PLMN ID, a generic public subscription identifier (GPSI), or the UE's profile information.

According to an embodiment of the present application, a method by a first server in a wireless communication system may comprise receiving a request message to request to provide information from a UE and transmitting information including information related to a plurality of edge computing service providers (ECSPs) and information used to select one from among a plurality of application servers included in the plurality of ECSPs, to the UE.

According to an embodiment of the present application, the method may further comprise receiving a request message to request information related to an application server included in the second server corresponding to an edge computing service provider (ECSP) from a UE and transmitting information related to the application server to the UE through the transceiver.

It should be noted that the configuration views, example views of edge computing service providing methods, example views of operational procedures, and configuration views of FIGS. 1 to 12 are not intended as limiting the scope of the disclosure. In other words, all the components, entities, or operational steps illustrated in FIGS. 1 to 12 should not be construed as essential components to practice the present invention, and the present invention may be rather implemented with only some of the components without departing from the gist of the present invention.

The above-described operations of the base station or terminal may be realized by equipping a memory device retaining their corresponding codes in the base station device or any component of the terminal device. That is, the controller in the eNB or terminal may execute the above-described operations by reading and executing the program codes stored in the memory device by a processor or central processing unit (CPU).

As described herein, various components or modules in the entity, base station or UE may be operated using a hardware circuit, e.g., a complementary metal oxide semi-conductor-based logic circuit, firmware, software, and/or using a hardware circuit such as a combination of hardware, firmware, and/or software embedded in a machine-readable medium. As an example, various electric structures and methods may be executed using electric circuits such as transistors, logic gates, or ASICs.

Although specific embodiments of the present disclosure have been described above, various changes may be made thereto without departing from the scope of the present disclosure. Thus, the scope of the disclosure should not be limited to the above-described embodiments, and should rather be defined by the following claims and equivalents thereof.

The invention claimed is:

1. A user equipment (UE) in a wireless communication system, comprising:
 a transceiver; and
 at least one processor,
 wherein the at least one processor is configured to:
  identify an address of a first server in a home network;
  transmit, to the first server, a first provisioning request message based on the address of the first server;
  receive, from the first server, a first provisioning response message including edge configuration server (ECS) configuration information including information related to a second server in a visited network, wherein the second server is provided by an edge computing service provider (ECSP) which has an agreement for the visited network;
  transmit, to the second server, a second provisioning request message based on the information related to the second server included in the ECS configuration information; and
  receive, from the second server, a second provisioning response message.

2. The UE of claim 1, wherein the at least one processor is further configured to:
 identify a pre-configured address of the first server in an edge enabler client of the UE.

3. The UE of claim 1,
 wherein the home network is a home-public land mobile network (H-PLMN), and
 wherein the visited network is a visited-public land mobile network (V-PLMN).

4. The UE of claim 1, wherein the ECS configuration information includes at least one of:
 single-network slice selection assistance information (S-NSSAI), and
 data network name (DNN).

5. The UE of claim 1, wherein the first provisioning request message includes location information of the UE.

6. The UE of claim 1, wherein the first provisioning request message includes at least one of a serving public land mobile network identifier (PLMN ID), a home PLMN ID, a generic public subscription identifier (GPSI), or profile information of the UE.

7. A first server in a wireless communication system, the first server comprising:
 a transceiver; and
 at least one processor, the at least one processor is configured to:
  receive, from a user equipment (UE), a provisioning request message to request to provide information; and
  transmit, to the UE, a provisioning response message including edge configuration server (ECS) configuration information including information related to a second server in a visited network, wherein the second server is provided by an edge computing service provider (ECSP) which has an agreement for the visited network.

8. The first server of claim 7, wherein the ECS configuration information includes at least one of:
 single-network slice selection assistance information (S-NSSAI), and
 data network name (DNN).

9. The first server of claim 7, wherein the provisioning request message includes location information of the UE.

10. The first server of claim 7, wherein the provisioning request message includes at least one of a serving public land mobile network identifier (PLMN ID), a home PLMN ID, a generic public subscription identifier (GPSI), or profile information of the UE.

11. A method performed by a user equipment (UE) in a wireless communication system, the method comprising:
 identifying an address of a first server in a home network;
 transmitting, to the first server, a first provisioning request message based on the address of the first server;
 receiving, from the first server, a first provisioning response message including edge configuration server (ECS) configuration information including information related to a second server in a visited network, wherein the second server is provided by an edge computing service provider (ECSP) which has an agreement for the visited network;
 transmitting, to the second server, a second provisioning request message based on the information related to the second server included in the ECS configuration information; and
 receiving, from the second server, a second provisioning response message.

12. The method of claim 11, further comprising:
 identifying a pre-configured address of the first server in an edge enabler client of the UE.

13. The method of claim 11, wherein the home network is a home-public land mobile network (H-PLMN), and
 wherein the visited network is a visited-public land mobile network (V-PLMN).

14. The method of claim 11, wherein the ECS configuration information includes at least one of:
 single-network slice selection assistance information (S-NSSAI), and
 data network name (DNN).

15. The method of claim 11, wherein the first provisioning request message includes location information of the UE.

16. The method of claim 11, wherein the first provisioning request message includes at least one of a serving public land mobile network identifier (PLMN ID), a home PLMN ID, a generic public subscription identifier (GPSI), or profile information of the UE.

17. A method performed by a first server in a wireless communication system, the method comprising:
 receiving, from a user equipment (UE), a provisioning request message to request to provide information; and
 transmitting, to the UE, a provisioning response message including edge configuration server (ECS) configuration information including information related to a second server in a visited network, wherein the second server is provided by an edge computing service provider (ECSP) which has an agreement for the visited network.

18. The method of claim 17, wherein the ECS configuration information includes at least one of:
    single-network slice selection assistance information (S-NSSAI), and data network name (DNN).

19. The method of claim 17, wherein the provisioning request message includes location information of the UE.

20. The method of claim 17, wherein the provisioning request message includes at least one of a serving public land mobile network identifier (PLMN ID), a home PLMN ID, a generic public subscription identifier (GPSI), or profile information of the UE.

* * * * *